(12) United States Patent
Kimura (10) Patent No.: US 6,690,999 B2
(45) Date of Patent: Feb. 10, 2004

(54) MANIPULATOR CONTROL METHOD

(75) Inventor: Shinichi Kimura, Koganei (JP)

(73) Assignee: Communications Research Laboratory, Independent Administrative Institution, Tokyo (JP)

( * ) Notice: Subject to any disclaimer, the term of this patent is extended or adjusted under 35 U.S.C. 154(b) by 1 day.

(21) Appl. No.: 10/200,179

(22) Filed: Jul. 23, 2002

(65) Prior Publication Data

US 2003/0018412 A1 Jan. 23, 2003

(30) Foreign Application Priority Data

Jul. 23, 2001 (JP) ........................................ 2001-221884

(51) Int. Cl.⁷ ............................................. G06F 19/00
(52) U.S. Cl. ....................... 700/245; 700/246; 700/247; 700/248; 700/249; 700/250; 700/251; 700/252; 700/253; 700/260; 700/261; 700/262; 700/263; 700/264; 318/568.1; 318/568.11; 318/568.12; 318/568.22; 901/1; 901/33; 901/45; 901/46; 901/47; 901/48; 701/23; 701/303; 600/595
(58) Field of Search .................... 700/69, 245, 246, 700/247, 249, 250, 251, 253, 260, 263, 264, 244, 248, 261, 262, 252; 318/568.11, 568.12, 568.22, 568.1, 628, 646, 648; 901/1, 33, 46, 47, 48, 9, 45, 34; 180/8.1, 8.6; 600/595; 701/23, 303

(56) References Cited

U.S. PATENT DOCUMENTS

| | | | | |
|---|---|---|---|---|
| 4,872,665 A | * | 10/1989 | Chareire | 601/35 |
| 5,055,755 A | * | 10/1991 | Ozawa et al. | 700/249 |
| 5,184,319 A | * | 2/1993 | Kramer | 703/5 |
| 6,059,506 A | * | 5/2000 | Kramer | 414/5 |
| 6,181,983 B1 | * | 1/2001 | Schlemmer et al. | 700/246 |
| 6,243,623 B1 | * | 6/2001 | Takenaka et al. | 700/245 |

FOREIGN PATENT DOCUMENTS

JP          02003039353 A  *  2/2003

* cited by examiner

Primary Examiner—William A. Cuchlinski, Jr.
Assistant Examiner—McDieunel Marc
(74) Attorney, Agent, or Firm—Oblon, Spivak, McClelland, Maier & Neustadt, P.C.

(57) ABSTRACT

A method for controlling a hyper-redundant manipulator including a plurality of links coupled by joints by determining the shape the manipulator takes when the end of the manipulator is moved to a target position, includes modeling each link as an elastic body having a natural length and a suitable modulus of elasticity that enables the elastic body to stretch and contract, simulating the overall shape of the manipulator when the end has been moved to the target position with the joints locked at a freezed angle and the joints are unlocked to return each link to its natural length, and moving the manipulator end to the target position by controlling each joint angle to match the simulation outcome.

16 Claims, 7 Drawing Sheets

— 1ST SPRING
--- 2ND SPRING
······ 3RD SPRING
--·- 4TH SPRING
---- 5TH SPRING

——1ST SPRING  ——6TH SPRING
--- 2ND SPRING  —— 7TH SPRING
······ 3RD SPRING  --- 8TH SPRING
--- 4TH SPRING  ······ 9TH SPRING
---- 5TH SPRING  —— 10TH SPRING

| —— 1ST SPRING | —— 6TH SPRING |
| --- 2ND SPRING | —— 7TH SPRING |
| ····· 3RD SPRING | --- 8TH SPRING |
| —·— 4TH SPRING | ······ 9TH SPRING |
| —··— 5TH SPRING | —— 10TH SPRING |

MANIPULATOR CONTROL METHOD

BACKGROUND OF THE INVENTION

1. Field of the Invention

The present invention relates to a method for controlling an industrial manipulator used for assembly, painting and operations in a factory, or a space manipulator used for carrying out inspections and assembly operations and the like in space. The invention particularly relates to a method for effectively controlling a hyper-redundant type manipulator having the degrees of freedom exceeding the required degrees of freedom.

2. Description of the Prior Art

In a manipulator in which a plurality of links are connected by joints, the necessary angle that each joint must have in order to move the manipulator tip to a target position is generally calculated by making up a Jacobi matrix for calculating tip displacement from the joint angle displacement, and using an inverse Jacobi matrix corresponding to the inverse transformation of the Jacobi matrix to find the joint angle values.

An inverse Jacobi matrix can be uniquely obtained with respect to a manipulator in which the degrees of freedom are the same as the required degrees of freedom. However, in the case of hyper-redundant manipulators that have more than the necessary degrees of freedom, it cannot be uniquely obtained because the Jacobi matrix becomes a rectangular matrix. Therefore, what designers have been doing is setting a number of constraint conditions and using singular value analysis or Lagrange's undetermined multiplier method or the like to calculate a pseudo inverse matrix.

However, when the above method is used to control hyper-redundant manipulators, the problem has been that as the difference between the necessary degrees of freedom and the degrees of freedom possessed by the manipulator increases, that is, as the degree of redundancy increases, the calculations become increasingly complex. In addition, it has been necessary to use special calculations to adapt to partial failure of the manipulator. It is also necessary to perform these calculations in a centralized manner, which has not been suitable for the distributed control structures that have been coming into general use in recent years.

Considerable work is underway to develop hyper-redundant manipulators that can move flexibly, avoid obstacles and cope with partial failures. In particular, manipulators with high hyper redundancy are being developed that when used for inspecting satellites in orbit, are adept at getting around objects and can continue to function even after suffering a partial failure. When this type of space-based application is considered, the calculation resources available for controlling the manipulator are highly limited by the harshness of the environmental conditions, such as radiation and extremely low temperatures. Therefore, there is a limit when it comes to centralized computation of joint angle values in the case of a manipulator having a high hyper redundancy. Development is therefore focusing on getting around individual constraints on computing resources by using processors to control joints, a modular configuration and decentralized control to achieve robustness with respect to failures. This being the case, it is also desirable to be able to readily apply such a distributed control structure as a way of determining manipulator joint angles.

An object of the present invention is to provide a manipulator control method that employs a technique of determining angles of manipulator joints to control a manipulator using a distributed control structure, that can be readily applied to manipulators having a high degree of redundancy and to manipulators that suffer failure.

SUMMARY OF THE INVENTION

To attain the above object, the present invention provides a method for controlling a hyper-redundant manipulator comprising a plurality of links coupled by joints, by determining a shape the manipulator forms from base to end when the end is moved to a target position, the method comprising: modeling each link as an elastic body having a natural length and an appropriate modulus of elasticity that enables the elastic body to stretch and contract just in a linkage direction, simulating an overall shape of the manipulator when the end has been moved to a target position with the joints locked at a freezed angle and the joints are unlocked to return each link to its natural length, and moving the manipulator end to the target position by controlling each joint angle to match the simulation outcome.

In the above manipulator control method, the modulus of elasticity of the elastic body constituting each link has a nonlinear characteristic.

In the method, when there is an obstacle to the movement of the manipulator end to the target position, the overall shape of the manipulator is determined by introducing the obstacle as an external force acting on each elastic body that is inversely proportional to a distance between the obstacle and each elastic body.

In the method, when a joint is unable to function, the overall shape of the manipulator is determined by connecting links on each side of the failed joint to assume a virtual link that is introduced as an assumed elastic body that can stretch and contract along a straight line that connects the ends of the virtual link and is treated as the natural length of the virtual link when the joint has become unmovable.

In the method, when the manipulator is selectively moved to a target position, the overall shape of the manipulator is determined by using a plurality of processing means to carry out a decentralized simulation of the overall shape.

With the manipulator control method of this invention, the time-evolution of a spring with a given displacement can be found by calculating the displacement produced in the spring, facilitating the calculation and making the method applicable to hyper-redundant manipulators. The time-evolution of a spring with a given displacement can also be calculated from the spring displacement and the external force at each end of the spring, making it possible to realize manipulator control using a decentralized control structure. The method can also be applied to a faulty manipulator by introducing a virtual link that includes the faulty joint.

Further features of the invention, its nature and various advantages will be more apparent from the accompanying drawings and following detailed description of the invention.

BRIEF DESCRIPTION OF THE DRAWINGS

FIG. 1($a$) is a schematic diagram of a two-dimensional manipulator.

FIG. 1($b$) is a conceptual diagram of the manipulator of FIG. 1($a$) modeled as a coupled spring system.

FIG. 2($a$) is a schematic diagram of a two-dimensional manipulator that has a faulty joint.

FIG. 2($b$) is a conceptual diagram of the manipulator of FIG. 2($a$) modeled as a coupled spring system.

FIG. 3($a$) is a schematic diagram of a two-dimensional manipulator with a nearby obstacle.

FIG. 3($b$) is a conceptual diagram of the manipulator of FIG. 3($a$) modeled as a coupled spring system.

FIG. 4($a$) is a drawing of a two-dimensional manipulator with five degrees of freedom modeled as a coupled spring, showing the simulated manipulator shapes obtained when the end was moved to each of four points.

DESCRIPTION OF THE PREFERRED EMBODIMENT

Before describing embodiments of the manipulator control method of the present invention with reference to the accompanying drawings and the method used to determine the joint angle will be explained.

N springs are coupled together to form a coupled spring system in which the natural length is the length of the links from L1 to LN. In the absence of a continuous application of an external force, the coupled spring system converges to a shape that satisfies each of the lengths L1 to LN. It is assumed that the springs do not bend or twist, but only stretch and contract one-dimensionally. If the spring has a nonlinear characteristic, the shape converges more swiftly than when the spring has a linear characteristic.

The manipulator discussed here is the length of the N links L1 to LN. The positions of the manipulator base and end effector are freezed, with the angles of the joints that couple the springs together in a non-changeable state. When the joints are then allowed to bend, if the base to the end of the coupled spring are within the extended total length (L1+L2+ ... LN) of the springs, by stretching or contracting, each spring will converge to a shape that satisfies length L1 to LN. The shape at this time (the angles of the joints) will be the shape of the manipulator that realizes the target position.

Thus, unlike in the prior art in which the angles to which the joints should be controlled are obtained directly, in the method of this invention, the joint angles are determined by simulating the shape obtained when the links constituted as elastic bodies that have been longitudinally deformed to move the end to the target position revert to their natural length, with the manipulator being controlled by the degree of change in the joint angles that accompanies the change in shape. Thus, if the overall shape of the manipulator is known before moving the manipulator end, it is possible to uniquely determine what the manipulator shape will be after the end is moved.

Thus, unlike in the prior art method of determining manipulator joint angles which requires that the manipulator shape, faulty joints, obstacles and the like be introduced into an inverse Jacobi matrix, in accordance with the method of the present invention, the shape can be determined merely by simulating the time-evolution of a spring having a given displacement, facilitating the calculation process and making the method applicable to manipulators having a high degree of hyper redundancy. The time-evolution of a spring to which displacement is applied can also be calculated from the displacement produced in the spring and the external force at each end of the spring, making it possible to readily realize a decentralized control structure by using a plurality of processors to perform the necessary calculations for determining the shape. This means that the method can be used to calculate the shape of hyper-redundant manipulators, even with the limited computing resources of computers used in space.

Figure 1A:
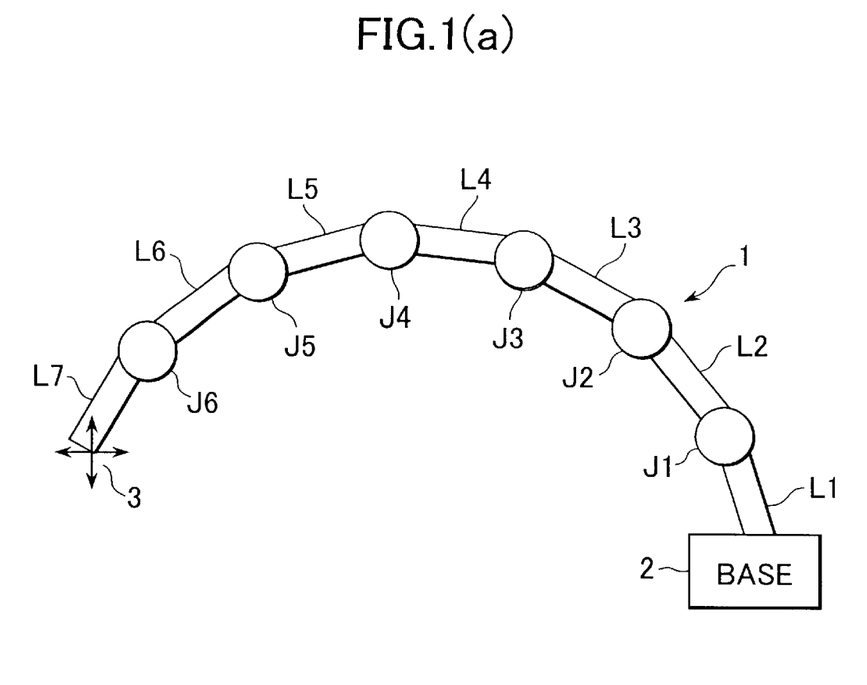
Figure 1B:
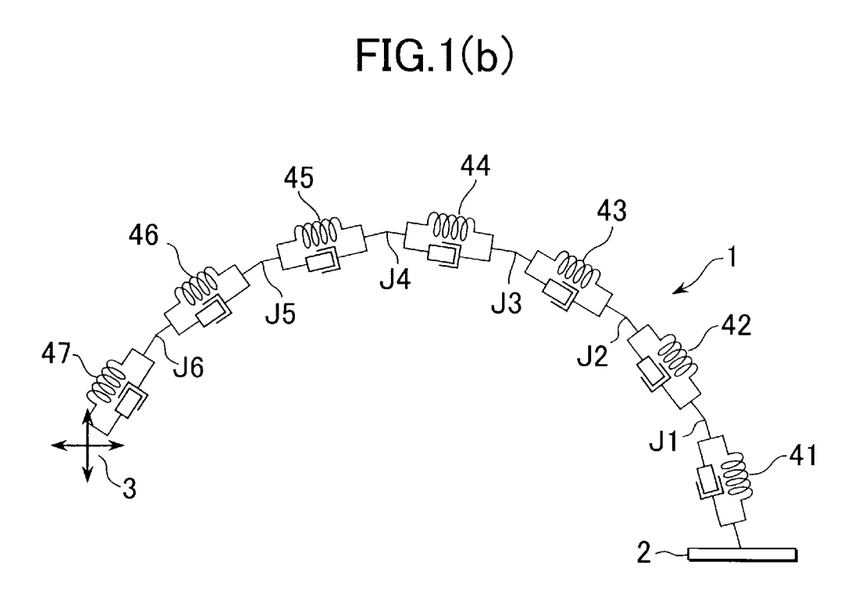

FIG. 1 will now be used to describe an embodiment of the present invention in which a coupled spring system is used to simulate the above manipulator. For simplicity, the invention is described with reference to its application to a two-dimensional manipulator system. The algorithm is extremely simple, and can therefore be readily extended to a three-dimensional system. It is assumed that the manipulator is being used to inspect a satellite in orbit, for which the task involves relative movement, from an existing position, of an end effector of a manipulator in an arbitrary initial state.

As shown in FIG. 1(a), manipulator 1 is formed as a movable arm comprised of first and second links L1 and L2 coupled by joint J1, second and third links L2 and L3 coupled by joint J2, third and fourth links L3 and L4 coupled by joint J3, fourth and fifth links L4 and L5 coupled by joint J4, fifth and sixth links L5 and L6 coupled by joint J5 and sixth and seventh links L6 and L7 coupled by joint J6. The movable arm has a base 2 at the base end (the end of the link L1 that is not attached to the joint J1) and an end effector 3 at the other end (the end of the link L7 that is not attached to the joint J6).

When this is modeled as a coupled spring, as shown in FIG. 1(b), the first link L1 is replaced by a first elastic body 41, the second link L2 by a second elastic body 42, the third link L3 by a third elastic body 43, the fourth link L4 by a fourth elastic body 44, the fifth link L5 by a fifth elastic body 45, the sixth link L6 by a sixth elastic body 46, and the seventh link L7 by a seventh elastic body 47; joints J1 to J6 are assumed to be freezed. The elastic bodies 41 to 47 are linked end to end, each functioning like a coil spring that has a suitable modulus of elasticity and can only stretch or contract in a straight line. The natural length of each of the elastic bodies 41 to 47 is equal to the length of the manipulator links L1 to L7.

The elastic function of the elastic bodies 41 to 47 is not limited to that of a coil spring, but may instead be that of any elastic material that can be modeled. In this embodiment, a spring is used that is assumed to have a natural length $L_0$ and nonlinear viscoelastic properties at a spring length L at a given instant. The spring dynamic is $$\frac{d^2 L}{dt^2} = K_1(L-L_0)^3 + K_2(L-L_0) + D\frac{dL}{dt} \qquad (1)$$

where $K_1$ is the modulus of elasticity of the nonlinear component, $K_2$ is the modulus of elasticity of the linear component, and D is the coefficient of friction produced by the movement of the spring. These parameters can be set to reproduce the desired physical properties in the elastic bodies. Coefficient of friction D is introduced as one of the parameters since the energy imparted by the elastic spring displacement is gradually released by the frictional effect as the spring converges to its natural length.

When a command is issued to effect relative movement of the end effector 3, simulations are carried out with the other parts of the coupled spring system (joints J1 to J6 and the coupling between base 2 and link L1) being freezed as the end is displaced in the specified direction, in which state the overall spring is released, with the simulation continuing until the coupled spring reaches a steady state, and the angle of curvature of the spring when the displacement goes below a certain value is indicated as the joint angle (since in the case of a nonlinear spring the oscillations can be quite pronounced, and it is inefficient to continue the simulation until the spring has come to a complete stop). Proper control of the manipulator 1 can be speedily achieved using calculations that impose only a small load on processors.

The number of calculation cycles required for the spring to converge to the natural length depends on the size of the displacement. In the case of a displacement in the order of 10 mm, 100 cycles are enough to achieve sufficient convergence. If there is enough processing capability for that, simulations for determining the joint angles can be performed with no problem. Therefore, by providing each link with its own calculation processing means, a decentralized processing system can be readily configured.

Figure 2A:
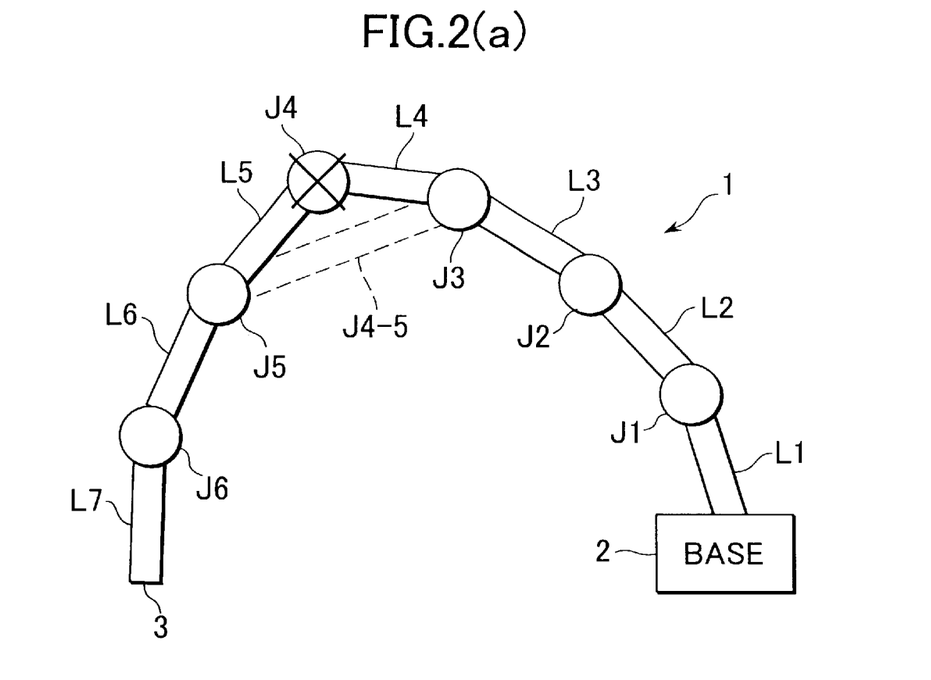

When the manipulator includes a faulty (freezed) joint, the manipulator can be modeled by introducing a powerful nonlinear spring having as its natural length the length of the links preceding and following the faulty joint. Specifically, as shown in FIG. 2(a), when the fourth joint J4 develops a fault that locks the joint angle so it cannot be controlled, the links on either side, links L4 and L5, are combined to form a virtual link L4-5 connecting joint J3 and joint J5.

Figure 2B:
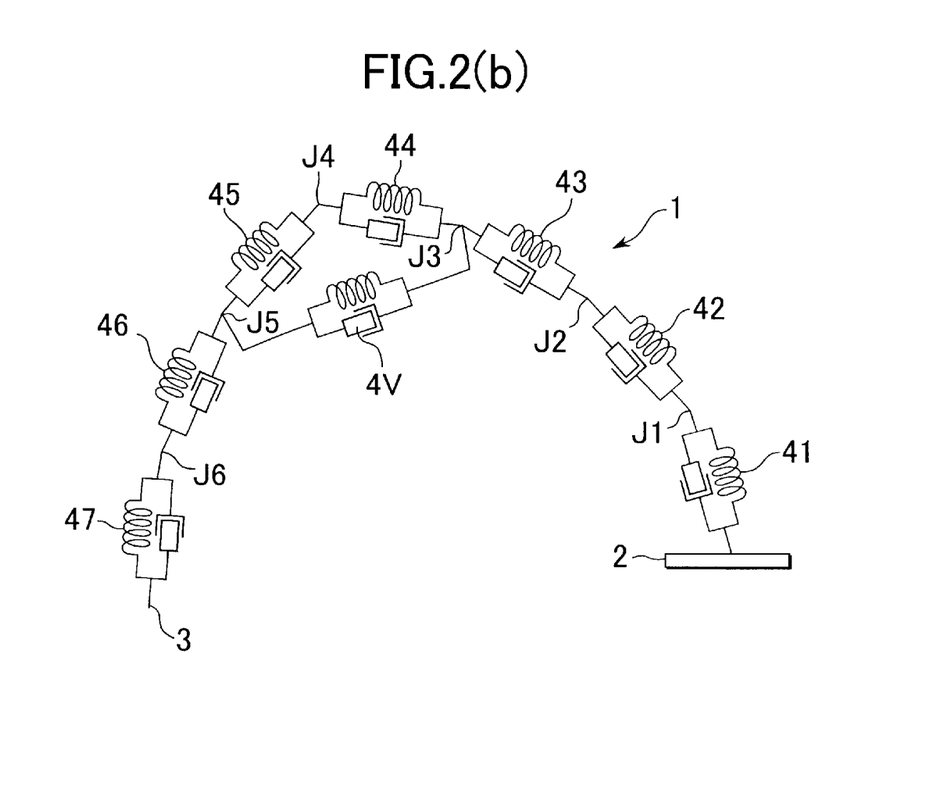

FIG. 2(b) shows a manipulator that includes the virtual link L4-5 modeled as a coupled spring. The difference from FIG. 1(b) is that the fourth elastic body 44, fourth joint J4 and fifth elastic body 45 are handled as being constituted by virtual elastic body 4V. Thus, the virtual elastic body 4V, corresponding to the virtual link L4-5, has a natural length that is the straight-line distance between the two ends of the virtual link L4-5 (from the end connected to joint J3 to the end connected to joint J5), and can stretch and contract along the line connecting the two ends of the virtual link L4-5. This being the case, the same method described above can be used to determine the angles of joints J1, J2, J3, J5 and J6 corresponding to the position to which the end effector 3 is moved. When there is a plurality of faulty joints, each can be modeled as a virtual elastic body. When there is a continuous succession of faulty joints, virtual elastic bodies can be introduced at each end of the drivable joints adjacent to the faulty joints.

With respect to controlling a manipulator in which the joint angles are limited owing to such factors as the physical structure of the joints and the like, the same functionality can be achieved by introducing a nonlinear spring connected to each side of the joints concerned. Joint angle limitations can be expressed by setting elastic body characteristics such as that the body produces no force when stretched above a certain length, or which produces a sudden counterforce when compressed by more than a certain amount, to prevent the joint being bent more when it is near its limit angle.

Figure 3A:
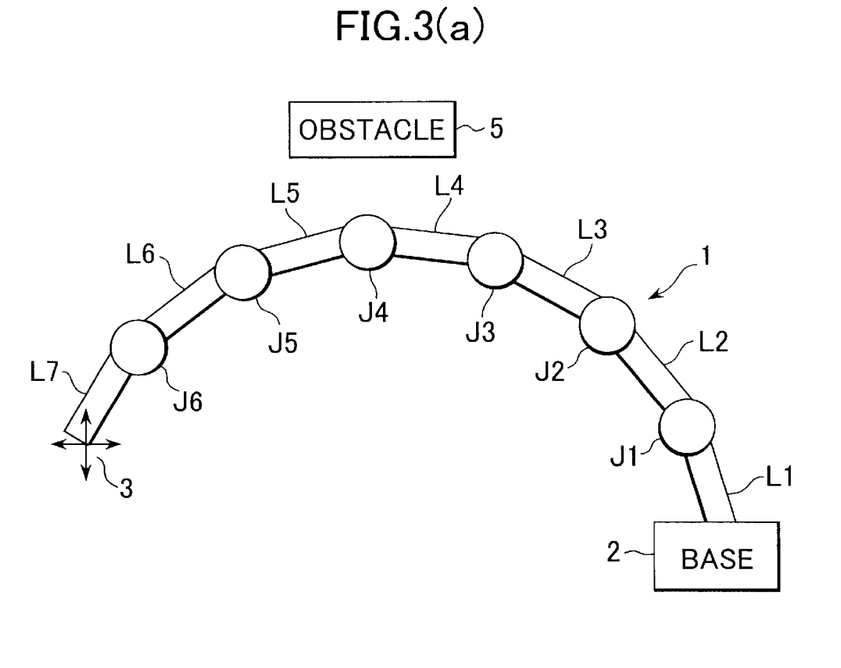
Figure 3B:
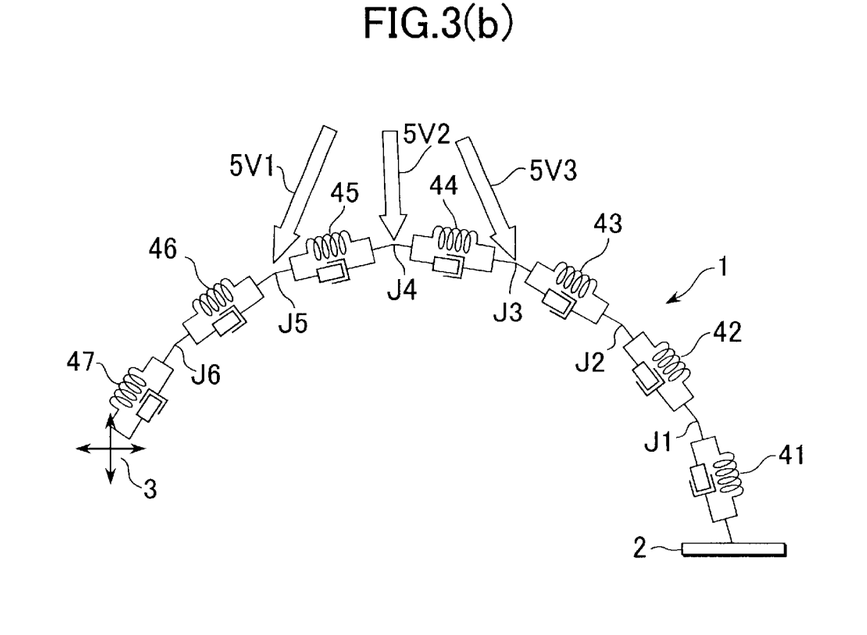

Also, when determining joint angles to operate a manipulator while avoiding an obstacle, the post-deformation shape of the manipulator can be simulated by introducing the obstacle as an outside force acting on the elastic bodies that is inversely proportional to the distance to the elastic bodies. A specific example is shown in FIG. 3(a), where there is an obstacle 5 in the vicinity of the manipulator. In this case, a shape can be calculated that ensures the manipulator maintains at least a given distance from the obstacle 5, by assuming virtual external forces 5V1 to 5V3 linking the position of the obstacle 5 with each of the joints concerned, as shown in FIG. 3(b), for example the joints J3 to J5 that are near the obstacle 5. External forces from the obstacle 5 that act on all the joints can be simulated. However, with external forces being inversely proportional to the distance involved, it is pointless to include in the calculations an external force on joints that will be substantially unaffected by the force. An external-force threshold value should therefore be set, and only the external force acting on a joint that exceeds the threshold should be calculated.

Figure 4A:
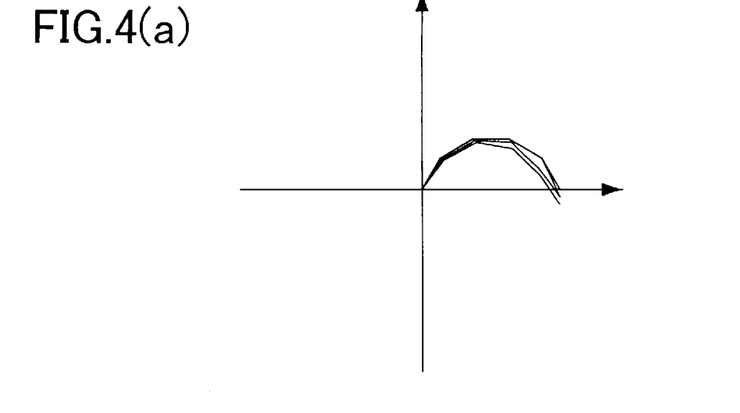
Figure 4B:
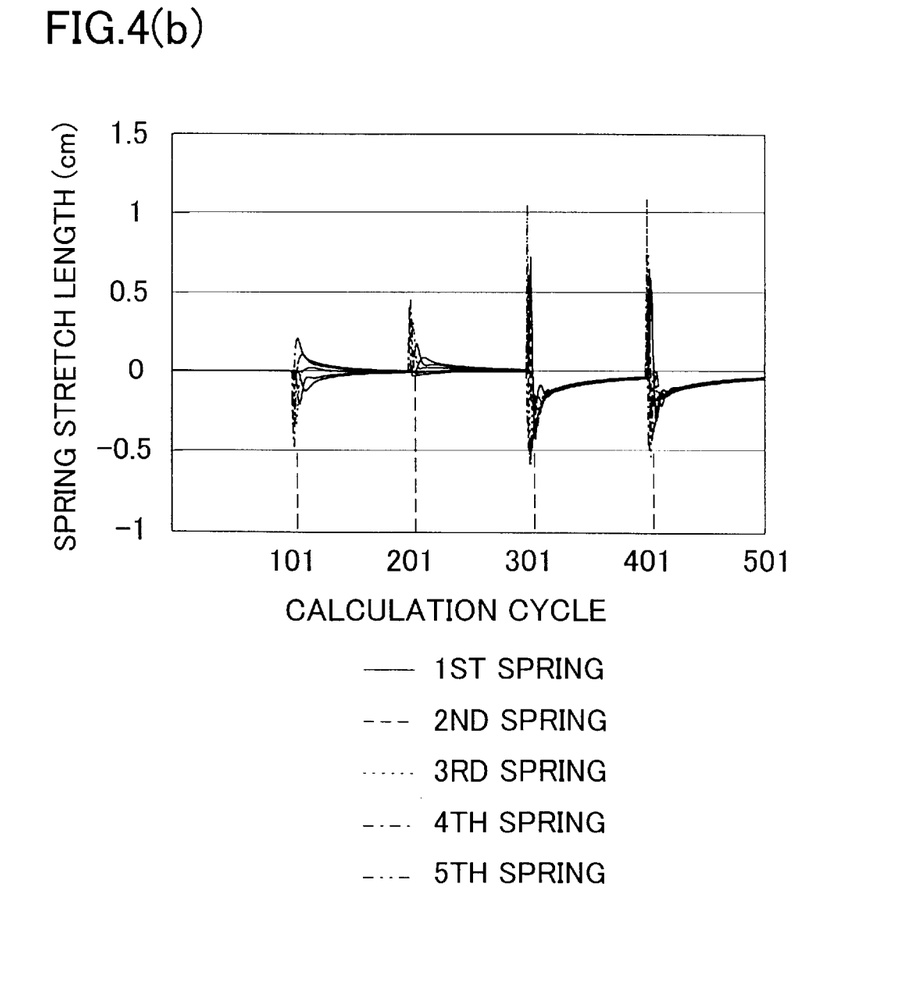
FIG. 4(b) shows the changes in the stretch length of the springs as the springs converge to their natural length with respect to each of the end positions in FIG. 4(a).

FIG. 4 shows the shape and the stretch time of each spring when the algorithm is applied to a two-dimensional manipulator that is 500 mm long and has five degrees of freedom, when the end was moved relatively 20 mm up, down, left, and right from an initial condition at which all joints were at an angle of 30 degrees. For this simulation, with the natural length $L_0$ of the nonlinear spring set at 10, the parameters were set as $K_1$=1000, $K_2$=0 and D=10. FIG. 4(a) shows line drawings of the converged shapes of the coupled spring when the manipulator end effector was moved backwards, forwards, left and right. These are the results of calculations by the control method of this invention. FIG. 4(b) shows time-based changes in the stretch length of each spring during this process. It can be seen that the spring stretch length rapidly decreased after the end effector was moved, converging to a stretch length of zero, meaning the natural length. This shows that with the control method of this invention, the resultant shape was derived very speedily.

FIG. 4(b) shows when the manipulator end effector was moved forward 20 mm at calculation cycle 101. Here, the spring displacement more or less fully converges within 60 calculation cycles. When the end effector was moved 20 mm back at calculation cycle 201, 20 mm up at calculation cycle 301 and 20 mm down at calculation cycle 401, in each case the stretch length converged within 60 calculation cycles.

Figure 5A:
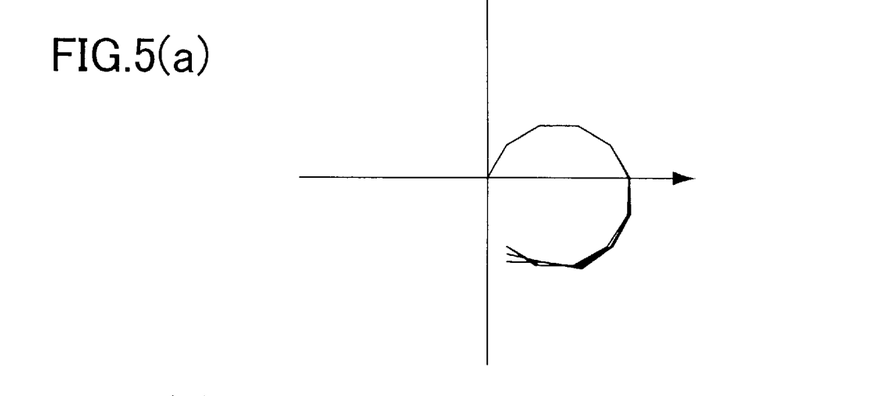
FIG. 5(a) is a drawing of a two-dimensional manipulator with ten degrees of freedom modeled as a coupled spring, showing the simulated manipulator shapes obtained when the end was moved to each of four points.
Figure 5B:
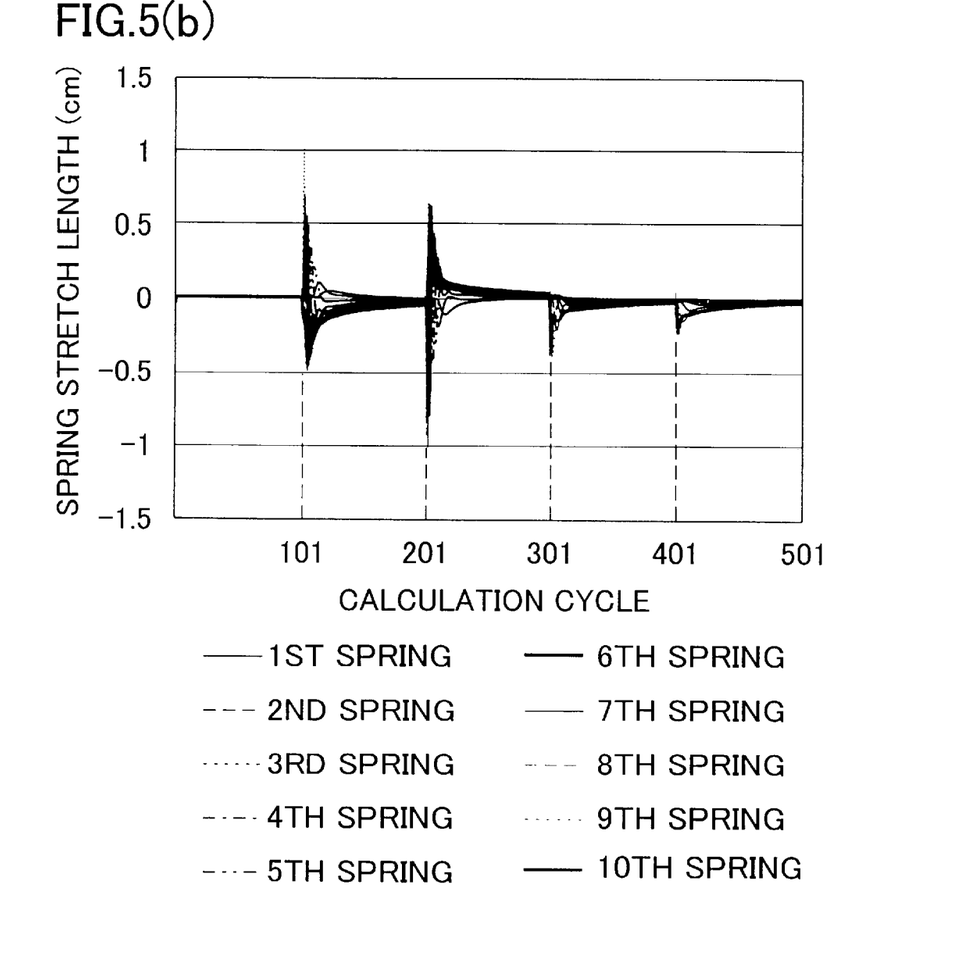
FIG. 5(b) shows the changes in the stretch length of the springs as the springs converge to their natural length with respect to each of the end positions in FIG. 5(a).

With respect to FIG. 5(a), the number of modules was increased and the same algorithm used to simulate a two-dimensional manipulator with ten degrees of freedom as a coupled spring; the drawing shows the simulated manipulator shapes obtained when the end effector was moved to each of four positions. FIG. 5(b) shows the changes in the stretch length of the springs as the springs converge to their natural length with respect to each of the end effector positions shown in FIG. 5(a). It can be seen that despite the increase in the degrees of freedom, algorithm operation was just as stable.

Figure 6A:
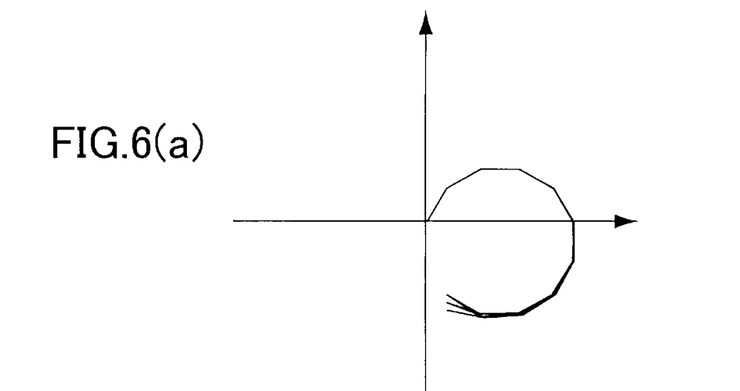
FIG. 6(a) is a drawing of a two-dimensional manipulator with ten degrees of freedom modeled as a coupled spring having linear characteristics, showing the simulated manipulator shapes obtained when the end was moved to each of four points.
Figure 6B:
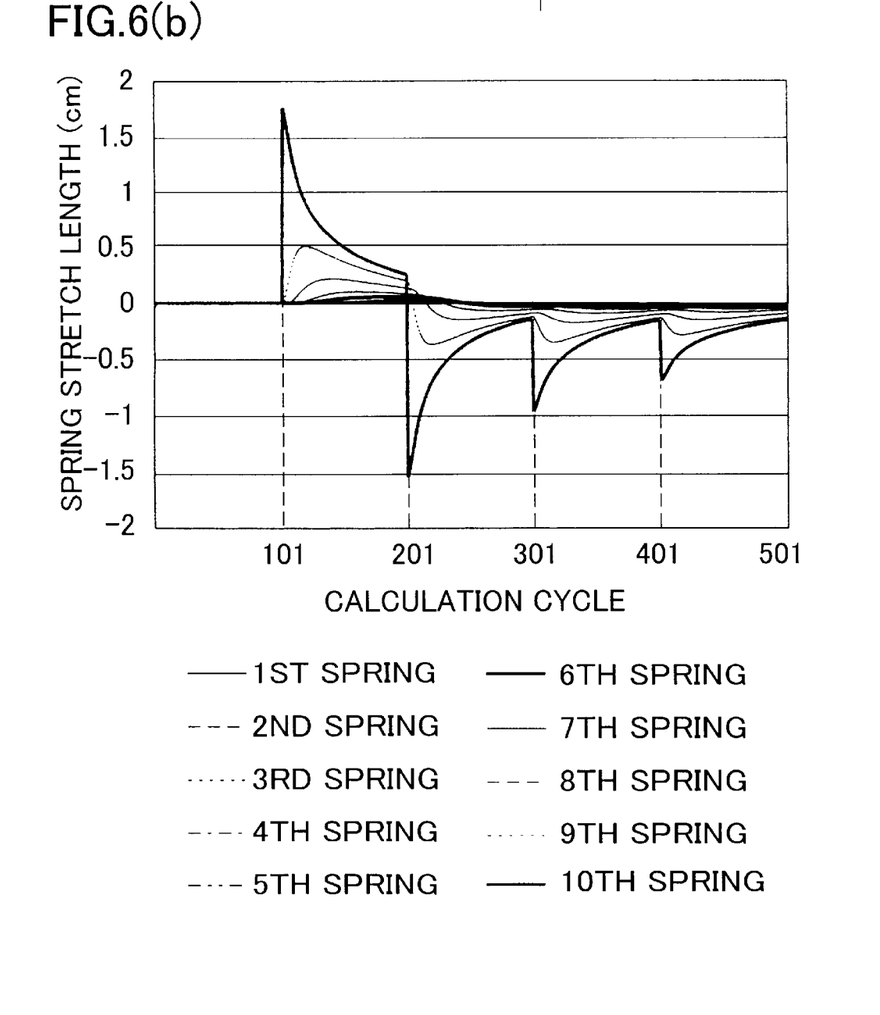
FIG. 6(b) shows the changes in the stretch length of the springs as the springs converge to their natural length with respect to each of the end positions in FIG. 6(a).
Figure 7A:
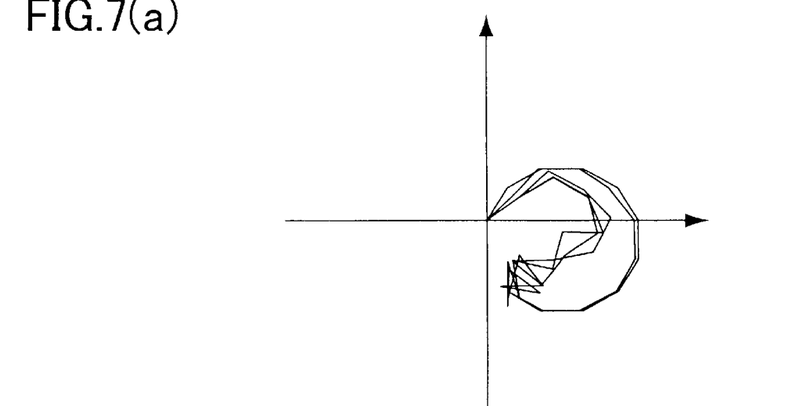
FIG. 7(a) is a drawing of a two-dimensional manipulator with ten degrees of freedom modeled as a coupled spring having excessively nonlinear characteristics, showing the simulated manipulator shapes obtained when the end was moved to each of four points.
Figure 7B:
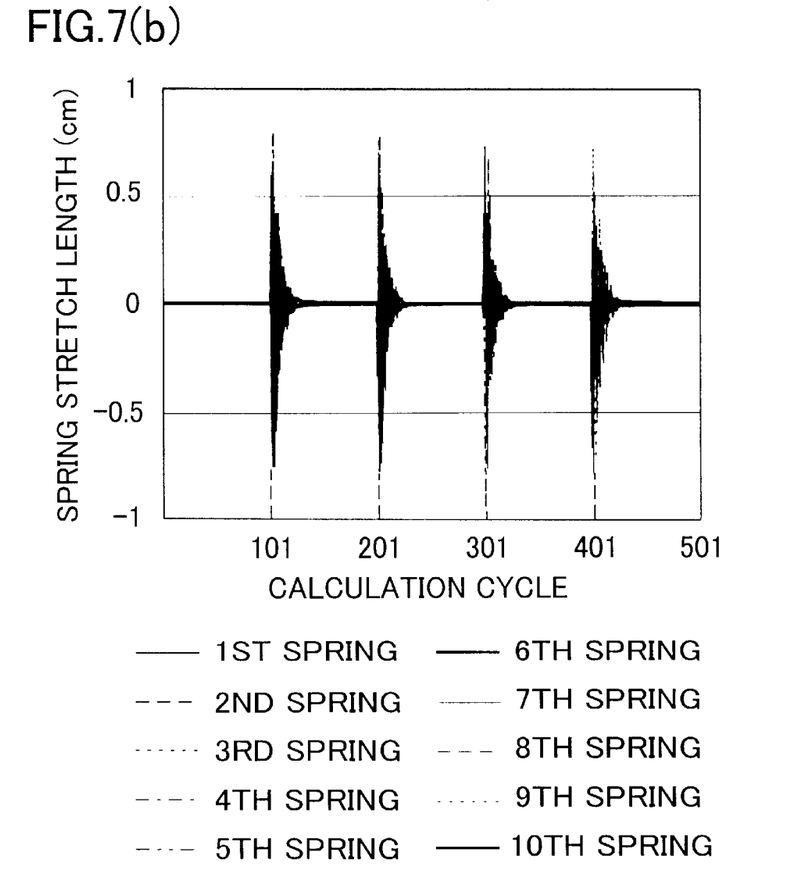
FIG. 7(b) shows the changes in the stretch length of the springs as the springs converge to their natural length with respect to each of the end positions in FIG. 7(a).

FIGS. 6 and 7 depict a two-dimensional manipulator with ten degrees of freedom with nonlinear spring constants $K_1$ and $K_2$, modeled as a coupled spring with linear characteristics in the case of FIG. 6, and modeled as a coupled spring with excessively nonlinear characteristics in the case of FIG. 7, showing the effect that spring nonlinearity has on the result. A comparison of the two figures shows that convergence to a steady state is faster in the case of a nonlinear spring. On the other hand, it was confirmed that when the nonlinearity is excessive, the displacement gives rise to strong vibrations and localized bending readily occurs. There is no particular limitation with respect to the modulus of elasticity to use for the simulated elastic bodies, and whether to use linear or nonlinear characteristics, which are options that come within the purview of design expertise.

As has been described in the foregoing, in accordance with the manipulator control method of the present invention, the manipulator shape can be determined merely by simulating the time-evolution of a spring with a given displacement, unlike in the prior art method in which the manipulator shape has to be introduced into an inverse Jacobi matrix. This facilitates calculations, which makes the method particularly effective in the case of manipulators having a high degree of redundancy. Moreover, the time-evolution of a spring that is displaced can also be calculated from the spring displacement, making it easy to realize a decentralized control configuration by using a plurality of processors to perform the necessary calculations for the shape determination. This means that the method can be used to calculate the shape of hyper-redundant manipulators even with the limited computing resources of computers used in space.

The elastic bodies used in accordance with the method can be given nonlinear characteristics, resulting in speedy convergence to their natural length and also reducing the number of calculation cycles required to obtain a simulation result. The control method can also be applied to shape-specific simulations by using the introduction of obstacles as external forces acting on the elastic bodies to obtain changes in joint angles accompanying the movement of the manipulator end effector to a target position.

The method can also be applied to shape-specific simulations in the case of a faulty manipulator by introducing a virtual link that includes the faulty joint or joints to obtain changes in joint angles accompanying the movement of the manipulator end effector to a target position, without using the special calculations that have to be employed in the prior art, and without having to perform the calculations in a centralized manner. Shape-specific simulations can also be carried out in a decentralized manner by using a plurality of processors, making it possible to configure a manipulator control system using relatively low-power CPUs disposed at each link.

What is claimed is:

1. A method for controlling a hyper-redundant manipulator comprising a plurality of links coupled by joints, by determining a shape the manipulator forms from base to end when the end is moved to a target position, the method comprising:
    modeling each link as an elastic body having a natural length and an appropriate modulus of elasticity that enables the elastic body to stretch and contract just in a linkage direction;
    simulating an overall shape of the manipulator when the end has been moved to a target position with the joints locked at a freezed angle and the joints are unlocked to return each link to its natural length; and
    moving the manipulator end to the target position by controlling each joint angle to match the simulation outcome.

2. The manipulator control method according to claim 1, wherein the modulus of elasticity of the elastic body constituting each link has a nonlinear characteristic.

3. The manipulator control method according to claim 2, wherein the overall shape of the manipulator, when there is an obstacle to the movement of the manipulator end to a target position, is determined by introducing the obstacle as an external force acting on each elastic body that is inversely proportional to a distance between the obstacle and each elastic body.

4. The manipulator control method according to claim 3, wherein the overall shape of the manipulator, when a joint is unable to function, is determined by joining links on each side of the failed joint to form a virtual link that is introduced as a virtual elastic body that can stretch and contract along a straight line that connects the ends of the virtual link that constitutes the natural length thereof.

5. The manipulator control method according to claim 4, wherein the overall shape of the manipulator, when the manipulator is selectively moved to a target position, is determined by using a plurality of processing means to carry out a decentralized simulation of the overall shape.

6. The manipulator control method according to claim 3, wherein the overall shape of the manipulator, when the manipulator is selectively moved to a target position, is determined by using a plurality of processing means to carry out a decentralized simulation of the overall shape.

7. The manipulator control method according to claim 2, wherein the overall shape of the manipulator, when a joint is unable to function, is determined by joining links on each side of the failed joint to form a virtual link that is introduced as a virtual elastic body that can stretch and contract along a straight line that connects the ends of the virtual link that constitutes the natural length thereof.

8. The manipulator control method according to claim 7, wherein the overall shape of the manipulator, when the manipulator is selectively moved to a target position, is determined by using a plurality of processing means to carry out a decentralized simulation of the overall shape.

9. The manipulator control method according to claim 2, wherein the overall shape of the manipulator, when the manipulator is selectively moved to a target position, is determined by using a plurality of processing means to carry out a decentralized simulation of the overall shape.

10. The manipulator control method according to claim 1, wherein the overall shape of the manipulator, when there is an obstacle to the movement of the manipulator end to a target position, is determined by introducing the obstacle as an external force acting on each elastic body that is inversely proportional to a distance between the obstacle and each elastic body.

11. The manipulator control method according to claim 10, wherein the overall shape of the manipulator, when a joint is unable to function, is determined by joining links on each side of the failed joint to form a virtual link that is introduced as a virtual elastic body that can stretch and contract along a straight line that connects the ends of the virtual link that constitutes the natural length thereof.

12. The manipulator control method according to claim 11, wherein the overall shape of the manipulator, when the manipulator is selectively moved to a target position, is determined by using a plurality of processing means to carry out a decentralized simulation of the overall shape.

13. The manipulator control method according to claim 10, wherein the overall shape of the manipulator, when the manipulator is selectively moved to a target position, is determined by using a plurality of processing means to carry out a decentralized simulation of the overall shape.

14. The manipulator control method according to claim 1, wherein the overall shape of the manipulator, when a joint is unable to function, is determined by joining links on each side of the failed joint to form a virtual link that is introduced as a virtual elastic body that can stretch and contract along a straight line that connects the ends of the virtual link that constitutes the natural length thereof.

15. The manipulator control method according to claim 14, wherein the overall shape of the manipulator, when the manipulator is selectively moved to a target position, is determined by using a plurality of processing means to carry out a decentralized simulation of the overall shape.

16. The manipulator control method according to claim 1, wherein the overall shape of the manipulator, when the manipulator is selectively moved to a target position, is determined by using a plurality of processing means to carry out a decentralized simulation of the overall shape.

* * * * *